United States Patent [19]

Matsui et al.

[11] Patent Number: 4,904,989
[45] Date of Patent: Feb. 27, 1990

[54] DISPLAY DEVICE

[75] Inventors: Makoto Matsui, Kunitachi; Jun-ichi Ohwada, Hitachi; Yasuhiro Shiraki, Hino; Eiichi Maruyama, Kodaira, all of Japan

[73] Assignee: Hitachi, Ltd., Tokyo, Japan

[21] Appl. No.: 115,616

[22] Filed: Oct. 30, 1987

Related U.S. Application Data

[63] Continuation of Ser. No. 467,301, Feb. 17, 1983.

[30] Foreign Application Priority Data

Feb. 17, 1982 [JP] Japan .................................. 57-22744

[51] Int. Cl.$^4$ .............................................. G09G 3/20
[52] U.S. Cl. ................................... 340/719; 340/718; 340/811; 340/784; 350/331 R
[58] Field of Search ............... 340/718, 719, 784, 811; 350/331 R, 333

[56] References Cited

U.S. PATENT DOCUMENTS

| | | | |
|---|---|---|---|
| 3,512,041 | 5/1970 | Dalmasso | 340/719 |
| 4,008,484 | 2/1977 | Maekawa et al. | 357/71 P |
| 4,023,890 | 5/1977 | Shiraso | 340/784 |
| 4,103,297 | 7/1978 | McGreivy et al. | 340/784 |
| 4,115,799 | 9/1978 | Luo | 357/23 TF |
| 4,199,778 | 4/1980 | Masuhara et al. | 357/71 P |
| 4,348,804 | 9/1982 | Ogawa et al. | 357/4 |
| 4,356,622 | 11/1982 | Widmann | 357/71 P |
| 4,385,292 | 5/1983 | Nonomura et al. | 340/784 |
| 4,429,305 | 1/1984 | Hosokawa et al. | 340/719 |
| 4,431,271 | 2/1984 | Okubo | 357/23 TF |
| 4,482,914 | 11/1984 | Mano et al. | 357/65 |
| 4,642,620 | 2/1987 | Togashi et al. | 340/719 |
| 4,644,338 | 2/1987 | Auki et al. | 340/719 |

FOREIGN PATENT DOCUMENTS 2226717 11/1974 France .

OTHER PUBLICATIONS

*Applied Physics*, "Application of Amorphous Silicon Field Effect Transistors in Addressiable LCD Panels", Snell et al, 1981, pp. 357-362.
*Proceedings of the S.I.O.*, "Thin-Film Transistor Switching of Thin-Film El Display Elements", Kun et al, vol. 21/2, 1986, pp. 85-91.

Primary Examiner—Gerald Brigance
Attorney, Agent, or Firm—Antonelli, Terry & Wands

[57] ABSTRACT

In a display device having, at least, picture elements which are arrayed on a transparent insulating substrate, and transistor portions which are formed of a semiconductor layer formed on the transparent insulating substrate; a display device characterized in that, at least, interconnection parts of the transistor portions extend above the semiconductor layer formed on the transparent insulating substrate.

The disconnection of the interconnection parts can be avoided.

7 Claims, 4 Drawing Sheets

DISPLAY DEVICE

This is a continuation of Ser. No. 467,301, filed 2/17/83.

The present invention relates to a thin-film transistor addressed display device. It is applicable to, for example, a liquid-crystal display device or an electroluminescent display device of the active-matrix addressing type.

In recent years, to the end of thinning and lightening display devices, a great deal of interest has taken place in the development of display devices which utilize liquid crystal, electroluminescence etc. and which are of the type scanned by a switching matrix composed of thin-film transistors.

In such display devices, it is desired that the substrate of picture elements be transparent. The reason is that, since the directions in which light is introduced and taken out can be selected at will, the selection of a displaying mode becomes more versatile. As a result, a picture of high contrast ratio can be formed, for example, in such a way that transmissive-type liquid-crystal display elements with a twisted nematic liquid-crystal layer held between two polarizers are illuminated from the rear. Another advantage is that a color display device can be readily provided by the use of light which is transmitted through filters of three colors. In applying the switching matrix of thin-film transistors to a display device, accordingly, it is desirable that a transparent substrate such as glass or quartz is used for rendering the picture element parts transparent and that a semiconductor film constituting the thin-film transistors is formed in selected parts outside the picture elements.

As an expedient for forming the switching matrix composed of the thin-film transistors, there has hitherto been principally adopted a method (the so-called "one pump-down method") in which, within a vacuum chamber held in a vacuum state, a semiconductor film, an insulator film and a metal film are deposited by mask evaporation in succession while metal masks are being changed. In this case, the semiconductor film, which constitutes the thin-film transistors being the elements of the switching matrix, has been formed in the shape of islands as shown in FIG. 1 by way of example. FIG. 1 is a plan view illustrating one picture element of the matrix. A sectional view taken along A—A' in FIG. 1 is shown in FIG. 2. In these figures, the same numerals indicate the same parts. The semiconductor film 2 is formed as the islands on a transparent insulating substrate 1. A source electrode 3 is electrically connected with one transparent electrode 7 of a display element (for example, a liquid-crystal element). A drain electrode 4 serves also as a signal electrode. A gate electrode 6, which is formed on a gate insulating film 5, serves also as a scanning electrode. Numeral 8 indicates an area where neither an electrode nor a semiconductor material is disposed.

Examples of such display devices are disclosed in the following literatures:
(1) IEEE Trans. Electron Devices, vol. ED-20, No. 11, pp. 995–1001, T. P. Brody et al (1973)
(2) Appl. Phys. 24, pp. 357–362, A. J. Snell et al (1981)

Recently, it has been attempted to form thin-film transistors in accordance with a fabrication process similar to that of single-crystal silicon devices by employing, e.g., a polycrystalline silicon film. Herein, patterns are formed by the use of photolithographic techniques. This is desirable from the viewpoints of improving the characteristics of the thin-film transistors and providing high precision for the interconnection patterns. In addition, as already described, it is desirable for the display device to have a transparent substrate for the picture elements. It is accordingly desirable to selectively etch the semiconductor film constituting the thin-film transistors, by the photolithographic techniques, so as to remove the parts of the semiconductor film corresponding to the picture elements. In this case, when the semiconductor film is left as the islands, a problem stated hereunder arises. As illustrated in FIG. 3, by way of example, the section of the pattern formed by the photolithographic techniques changes abruptly from a film thickness d to a film thickness o. As illustrated in FIG. 4, this has led to the disadvantage that, when an electrode bus 12 is formed on the film 11 having such stepped part, it is susceptible to disconnection as indicated at numeral 13. Accordingly, the switching matrix of the thin-film transistors, which are formed on the semiconductor film selectively etched into the islands by the photolithographic techniques, has had the disadvantage that defects ascribable to the disconnection of the interconnection bus are prone to occur.

Another disadvantage of the prior-art switching matrix of the thin-film transistors having the structure as shown in FIG. 1, is that when the switching matrix is applied to a display device, the contrast of display viewed as a whole is inferior. More specifically, with the structure as shown in FIG. 1, there are the parts as indicated at numeral 8, which are not electrode portions and which are not covered with the semiconductor film, either. For example, in the case of a liquid-crystal display device, liquid crystal located in the area 8 has no voltage applied thereto and is overlaid with no material for shielding it from light. Therefore the light transmissivity for the part 8 is always great in some liquid crystal modes of operation. This is, the display device which employs the prior-art switching matrix of the structure as shown in FIG. 1 has had, in some displaying modes, the disadvantage that the contrast of display viewed as a whole is inferior. Of course, this disadvantage can be eliminated by providing a special mask adapted to shield the transmitted light of parts irrelevant to the display. In this case, however, the obvious disadvantages are incurred of the addition of a step and the increase of production cost attributed to the disposition of the mask.

A first object of the present invention is to provide an active matrix having a structure in which electrode buses are less prone to disconnection even in a case of forming an active matrix of thin-film transistors by the use of photolithographic techniques, and according to which a display device displaying a good picture of few defects can be provided.

A second object of the present invention is to provide a structure of a thin-film transistor matrix for a display device, which structure can be simply fabricated and affords a good contrast ratio of display.

In order to accomplish the first object, the present invention adopts a structure obtained in such a way that a semiconductor film is selectively etched in the shape of, for example, meshes. Electrode buses, other than transparent electrodes, are disposed above the part of the semiconductor film left unetched. As a result, the electrode buses other than the transparent electrodes do not traverse the stepped parts of the semiconductor film, so that the disconnection at the stepped parts does not arise. In order to accomplish the second object, the invention adopts a structure in which, as shown in FIG. 6, transparent electrodes 27 are disposed in a manner to cover areas 22 where a semiconductor film 21 formed in the shape of meshes is not existent.

Now, the present invention will be described in detail with reference to two embodiments.

EMBODIMENT 1

There will now be explained an embodiment concerning a display device of 5×5 picture elements which has been formed in such a way that a polycrystalline silicon (poly-Si) film formed on a quartz substrate is used to form a matrix of 5×5 poly-Si thin-film transistors, and that the switching matrix is combined with liquid-crystal display elements.

Figure 1:
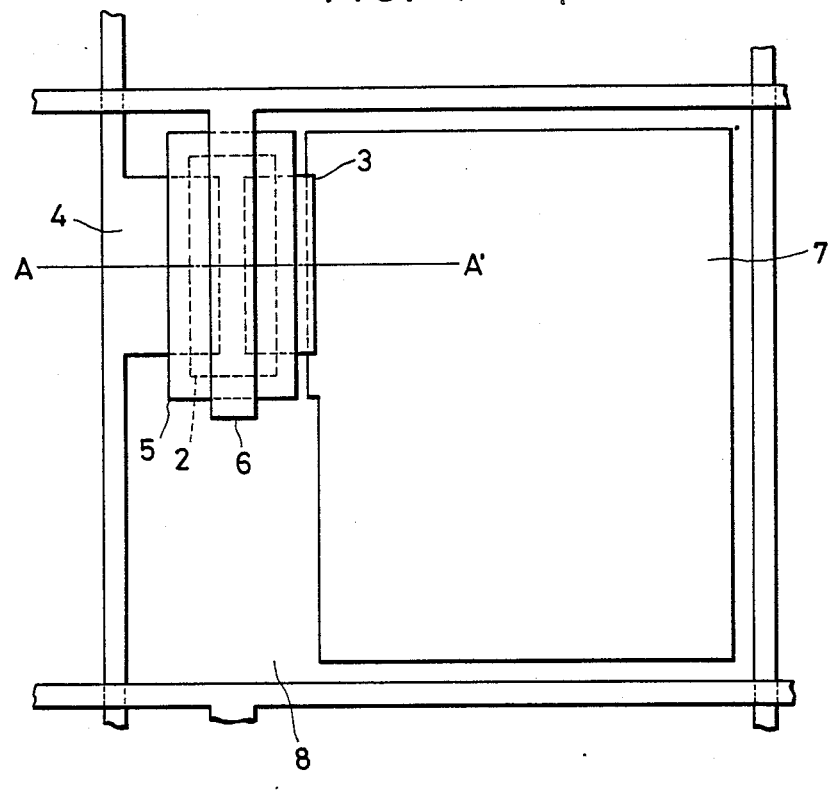
FIGS. 1 and 2 are a plan view and a sectional view showing one picture element of a switching matrix of thin-film transistors in a prior art arrangement, respectively.
Figure 2:
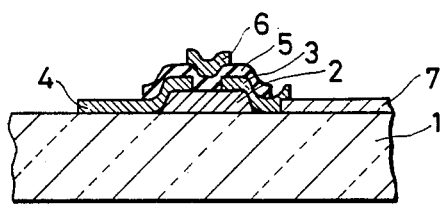
Figure 3:
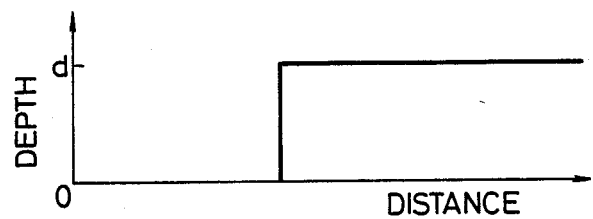
FIG. 3 is a diagram showing the shape of a typical section of a thin-film pattern formed an a selected part of a surface by photolithographic techniques.
Figure 4:
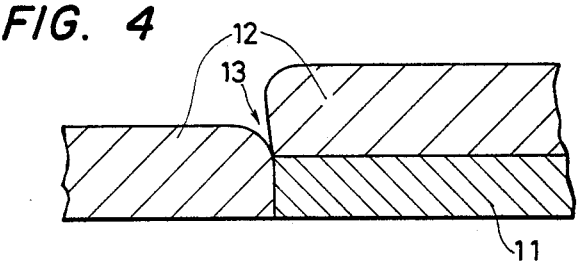
FIG. 4 is a diagram showing the section of a disconnected bus ascribable to a stepped part in an arrangement such as the device of FIGS. 1 and 2.
Figure 5:
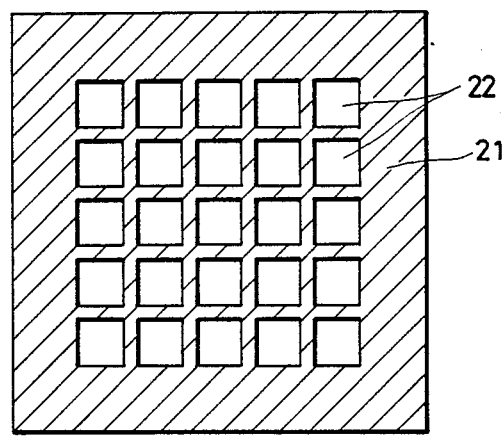
FIG. 5 is a plan view showing the shape of a semiconductor film etched in the shape of meshes in an embodiment of the present invention.
Figure 6:
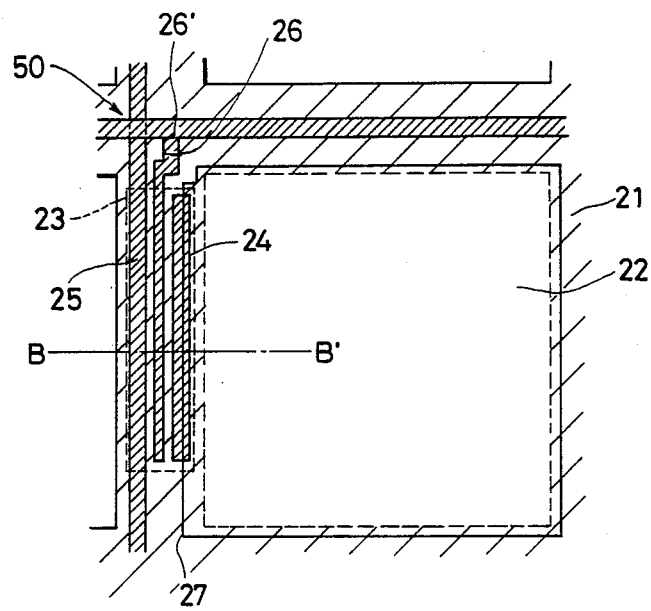
FIGS. 6 and 7 are a plan view and a sectional view showing one picture element of a switching matrix of thin-film transistors in an embodiment of the present invention, respectively.
Figure 7:
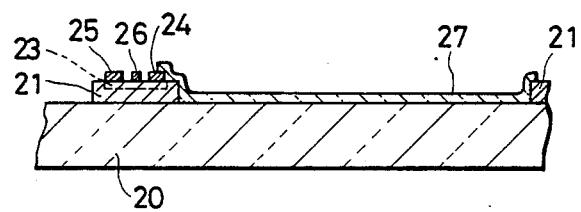
Figure 8:
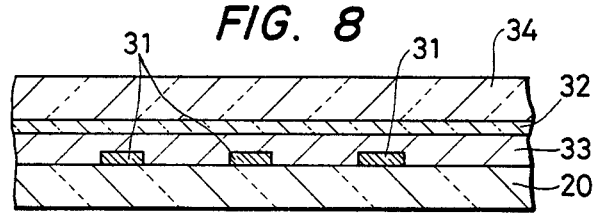
FIG. 8 is a sectional view of a liquid-crystal display device formed in accordance with an embodiment of the present invention.

A poly-Si film is formed on a quartz substrate to a thickness of 1 μm, and it is selectively etched in the shape of meshes as shown in FIG. 5. The poly-Si film is evaporated, for example, in ultra-high vacuum with a pressure below $10^{-8}$ Torr. FIG. 5 is a schematic plan view of the poly-si meshes for the whole display device. The poly-Si film is selectively etched so as to leave a hatched part 21 behind. Parts 22 where the poly-Si film has been removed, become picture element parts. The transparent insulating substrate is exposed to these parts 22. FIG. 6 is a plan view of a switching matrix with one picture element thereof enlarged, while FIG. 7 is a sectional view taken along B—B' in FIG. 6. In both the drawings, the same numerals indicate the same parts. In each part 23 within the poly-Si film 21 left behind by the selective etching, a metal-oxide-semiconductor (MOS) field-effect transistor is formed, which is provided with a source electrode 24, a drain and signal electrode bus 25 and a gate and scanning electrode bus 26, 26'. The signal electrode bus 25 and the scanning electrode bus 26' form two-level interconnection layers insulated by an insulator at the point of intersection 50 thereof. Thereafter, a transparent picture-element electrode (5,000 Å thick) 27 of indium-tin-oxide or the like is formed. This transparent picture-element electrode is arranged so that it can be electrically connected with the source electrode 24 and so that it covers the picture element part 22 with the poly-Si film removed therefrom. The transparent electrode 27 can be satisfactorily formed by a conventional method, for example, a sputtering process an evaporation process. As shown in FIG. 8, which shows an implementation of the FIGS. 6 and 7 device in a liquid crystal structure, a transparent common electrode 32 of indium-tin-oxide or the like is disposed in opposition to the transparent picture-element electrodes 27 which is connected with the thin-film transistors 31 formed as described above, and a liquid crystal 33, for example, PCH (phenyl cyclohexane)-based liquid crystal or biphenyl-based liquid crystal is contained between the transistors and the common electrode. Thus, the transmissive-type liquid-crystal display device of 5×5 picture elements has been formed. Needless to say, each thin-film transistor 31 has its section constructed as shown in FIG. 7. The gap between the transparent picture-element electrode 27 and the transparent common electrode 32, namely, the thickness of the liquid-crystal layer, is 10 μm. The way of constructing the liquid-crystal display device itself is similar to that in the prior art. Only the construction on one faceplate is different due to utilizing the arrangement described for FIGS. 6 and 7. The transparent common electrode 32 is supported by a glass substrate 34. Shown at numeral 20 is the quartz substrate on which the switching matrix has been formed. By way of example, the source electrode 24, the drain and signal electrode bus 25 and the gate electrode 26 are formed of aluminum, and the scanning electrode bus 26' is formed of a multi-layer film of Cr and Au. In the latter, Cr is for bonding and is about 500 Å thick, and Au is about 5,000 Å thick.

As apparent from FIGS. 6 and 7, according to the present invention, none of the source electrode 24, the drain and signal electrode bus 25, the gate electrode 26 and the scanning electrode 26' traverse the stepped portion of the poly-Si film. Accordingly, the possibility of the disconnection of the three spaced electrodes ascribable to the stepped portion of the poly-Si film is eliminated. According to an example of the present embodiment, a good picture of few defects can be displayed.

As seen from FIGS. 6 and 7, the transparent picture-element electrode 27 inevitably extends over stepped portion of the poly-Si film. Since, however, the transparent picture-element electrode 27 may join to a part of the long stepped portion, the disconnection of the transparent picture-element electrode is not generally caused by the stepped portion.

Since the poly-Si film formed in the shape of meshes is small in light transmissivity irrespective of voltages applied to the respective picture elements, it shields the transmitted light of portions which are irrelevant to the display. Thus, according to the example of the present embodiment, the contrast ratio of the display viewed as a whole was enhanced. By way of example, let's consider a case where the occupying area of the picture elements is 60% with respect to the whole screen. When the regions of the screen other than the picture elements are made transparent without applying the technique of the present invention, the contrast ratio of a picture degrades to about 2.5 independent of that of the picture elements themselves. In contrast, when the present invention is applied, the contrast ratio of the picture elements themselves which is usually more than 20 can be secured.

In the present embodiment, in order to enhance the contrast ratio of the display viewed as a whole, a mask which shields the transmitted light of parts irrelevant to the display is not necessary because the shape of the semiconductor film which is a constituent material of the thin-film transistors is designed to carry out the function of the above mask for the semiconductor film. Thus, since the additional mask need not be disposed, the production process is simplified and the production cost can be reduced. For this reason the present invention has a high industrial value.

EMBODIMENT 2

Figure 9:
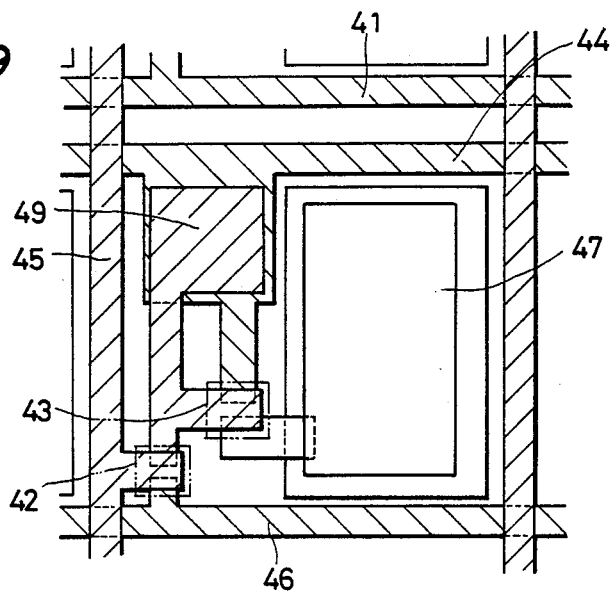
FIG. 9 is a partial plan view of an electroluminescent display device.
Figure 10:
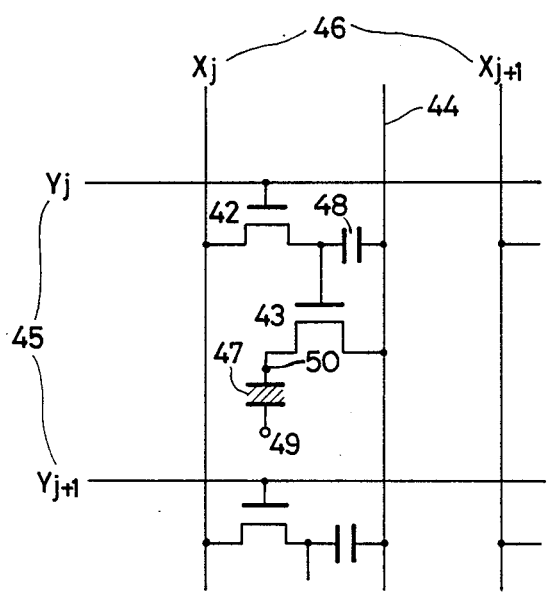
FIG. 10 is an equivalent circuit diagram of the electroluminescent display device.

An embodiment in the case of applying the present invention to an electroluminescent (EL) display device will be described hereunder. FIG. 9 is a plan view showing one picture element of the embodiment of a switching matrix of thin-film transistors for the EL display device. On a semiconductor film 41 etched in the shape of meshes, there are formed two thin-film transistors 42 and 43 and the three electrode buses of a power electrode bus 44, a scanning electrode bus 45 and a signal electrode bus 46, which are coupled with the picture element electrode 50 of an EL element and capacitor 48. The semiconductor film is left unetched in parts other than the portions of EL elements. An equivalent circuit of the device is as shown in FIG. 10. This circuit is customary as the transistor matrix for driving EL elements. The thin-film transistor matrix is overlaid with the EL elements 47 which are further overlaid with a common counter electrode 49. The EL element 47 is so constructed that, for example, an active layer of ZnS:Mn having a thickness of 5000 Å is sandwiched between insulating layers, for example, $Sm_2O_3$ films having a thickness of 2000 Å. Either the picture element electrode 50 or the common counter electrode 49 is formed of a transparent electrode so as to derive light emitted therefrom. Since, in this case, light emitting elements are used, it does not occur that parts irrelevant to the display lower the contrast of the display. Therefore, the present embodiment does not bring forth the second effect of the present invention mentioned previously, namely, the effect of enhancing the display quality. In the present embodiment, however, the electrode buses are less prone to disconnection owing to the present invention. Accordingly, an EL display device which displays a good picture with few defects has been obtained.

In this manner, the present invention is applicable to various display devices.

As described above in detail, according to the present invention, the disconnection of electrode buses can be reduced, and transmitted light through parts irrelevant to display can be shielded without employing any special mask. According to the present invention, therefore, a display device which displays a picture of good quality having few defects and exhibiting a favorable contrast ratio can be fabricated simply and at low cost. This is greatly effective in industry.

What is claimed is:
1. An active matrix display device comprising:
   picture elements which are arrayed on a transparent insulating substrate;
   a semiconductor layer formed on said transparent insulating substrate;
   a transistor matrix which is formed using said semiconductor layer; and
   bus conductors coupled to said transistor matrix,
   wherein said semiconductor layer is formed in the shape of a mesh, and said bus conductors extend only inside an area where said mesh-shaped semiconductor layer exists so as not to extend over edges of said mesh-shaped semiconductor layer.

2. An active matrix display device defined in claim 1, wherein said bus conductors are column electrode buses and row electrode buses.

3. An active matrix display device defined in claim 1, wherein said picture elements are picture elements utilizing liquid crystal.

4. An active matrix display device defined in claim 1, wherein said picture elements are picture elements utilizing electroluminescence.

5. An active matrix display device defined in claim 1, wherein said transistor matrix is comprised of transistors having a pn junction in source and drain contact regions.

6. An active matrix display device defined in claim 1, wherein said semiconductor layer is formed of polycrystalline silicon.

7. An active matrix display device defined in claim 1, wherein said transparent insulating substrate is formed of quartz.

* * * * *